United States Patent [19]

Shapiro et al.

[11] Patent Number: 5,619,040

[45] Date of Patent: Apr. 8, 1997

[54] DATA ACQUISITION SYSTEM

[76] Inventors: Stephen L. Shapiro, 14228 Amherst Ct., Los Altos Hills, Calif. 94022; Sudhindra Mani, 1618 17th St., Sacramento, Calif. 95814; Eugene L. Atlas, 440 De Anza Ct., Oceanside, Calif. 92057; Dieter H. W. Cords, 526 Cuesta Real, La Honda, Calif. 94020; Britt Holbrook, 4540 Varsity Ct., Sacramento, Calif. 95841

[21] Appl. No.: 219,182

[22] Filed: Mar. 29, 1994

[51] Int. Cl.$^6$ ................................................. H01L 29/78
[52] U.S. Cl. ................................ 250/370.09; 327/337
[58] Field of Search ................ 250/370.09; 327/337, 327/94

[56] References Cited

U.S. PATENT DOCUMENTS

| | | | |
|---|---|---|---|
| 4,593,381 | 6/1986 | Shapiro et al. | 365/45 |
| 5,061,865 | 10/1991 | Durst | 327/94 |
| 5,355,013 | 10/1994 | Parker | 250/370.08 |

OTHER PUBLICATIONS

Parker, S. "A Proposed VLSI Pixel Device for Particle Detection" Nucl. Instr. & Meth. in Phys. Res., A275 (1989) p. 494.

Primary Examiner—Davis L. Willis
Assistant Examiner—Richard Hanig
Attorney, Agent, or Firm—Calvin Ward

[57] ABSTRACT

A data acquisition circuit for a particle detection system that allows for time tagging of particles detected by the system. The particle detection system screens out background noise and discriminate between hits from scattered and unscattered particles. The detection system can also be adapted to detect a wide variety of particle types. The detection system utilizes a particle detection pixel array, each pixel containing a back-biased PIN diode, and a data acquisition pixel array. Each pixel in the particle detection pixel array is in electrical contact with a pixel in the data acquisition pixel array. In response to a particle hit, the affected PIN diodes generate a current, which is detected by the corresponding data acquisition pixels. This current is integrated to produce a voltage across a capacitor, the voltage being related to the amount of energy deposited in the pixel by the particle. The current is also used to trigger a read of the pixel hit by the particle.

4 Claims, 2 Drawing Sheets

DATA ACQUISITION SYSTEM

FIELD OF THE INVENTION

The present invention relates to particle detection systems, and more particularly to electronic data acquisition circuitry for obtaining information relating to the position and arrival time of charged particles or photons arriving at a particle detector, and the energy deposited by the particles or photons at the detector.

BACKGROUND OF THE INVENTION

The detection and analysis of particles, such as charged particles or photons, is important in many fields. High energy physics, for example, generally involves the detection and analysis of charged particles. A variety of medical specialties require detection and analysis of various types of radiation, such as x-rays. Depending on the field and the specific application, different types of information relating to the relevant particles may be required. For example, it may be necessary to detect the spatial position of particles, the arrival time of the particles at one or more spatial positions, the cumulative or individual energy deposited by the particles, and/or the identity of the detected particles.

A wide variety of particle detection systems are available. All particle detection systems, however, ultimately depend on the fact that particles transfer energy to the medium the particles are traversing, generally through the process of ionization or excitation of the atoms in the medium. The particles are sent through a selected detection medium, or detector, thereby transferring energy to the detector. The amount, position, and/or time of generation of this deposited energy is used to obtain desired information on the particles.

The choice of a particle detection system depends on the types of particles to be detected and the type and quality of information to be collected concerning the particles. In fact, one problem of conventional particle detection systems is that the same basic hardware generally can be used only for detection of certain types of particles. A single user may therefore be required to have numerous separate particle detection systems in order to detect different types of particles of interest to that user.

In many applications, it is necessary to detect the spatial position of the incoming particles. Depending on the type of particles and the degree of spatial resolution required, this may be accomplished using a continuous film that is "exposed" or altered in some manner when particles hit it. The degree of exposure at various points on the film is related to the particles that have hit the film. Thus, the particles hitting the film during a selected period of time will create an image on the film that can be examined to obtain desired information. The degree of spatial resolution permitted depends in part on the characteristics of the film.

As an alternative to this type of detector, the detector area may be divided into a two-dimensional array of "pixels," each pixel having a relatively small area, where the total energy deposited in each of the pixels in a given period of time is measured. In pixel-based detection systems, the degree of spatial resolution depends in part on the size of the pixels, with smaller pixel size allowing for higher spatial resolution. Such arrays may be viewed as a large number of individual particle detectors in which each detector consists of a particle interaction region and electronics to read out the energy deposited in the interaction region by the particle. The minimum size of the pixels, and thus the spatial resolution, is limited by the amount of electronic circuitry that is in the pixels.

In many applications, such as conventional medical x-rays, the pattern and cumulative effects of a large number of particles are recorded. In such applications, the precise characteristics and arrival time of individual particles are generally ignored. Each pixel in the resultant image represents a measure of the average number and energy of the particles reaching the detector. In this type of system, the array of detectors is typically read only once per image. Each of the particle detectors accumulates a number of hits during the image recording time. Hence, the output of the array is a function of the average energy deposited per pixel per particle, multiplied by the average number of particles passing through the pixel during the measurement time.

In many applications, it is useful or necessary to take into account the characteristics of the individual particles. The two most useful characteristics are the energy of the particle reaching the detector and the time of arrival of the particle. For example, consider the case of an image made by injecting a patient with a radioactive isotope that emits gamma-rays of a known energy. An image is generated by measuring the gamma rays that leave the patient's body traveling in a specified direction. Each pixel records a measure of the average number of gamma-rays reaching the pixel detector per unit time. The trajectory of some of the gamma-rays will be altered by interactions with the tissue of the patient's body. Ideally, one would like to eliminate these gamma-rays. These gamma-rays are generally distinguishable from gamma-rays that did not have such interactions by their energy; the interacting gamma-rays having lower energies. Hence, by measuring the energies of the gamma-rays that reach the detector and ignoring gamma-rays with energies below a predetermined value, these gamma-rays can be eliminated from the image and a higher resolution image obtained.

Similarly, background noise often affects the resolution of the detection system in terms of both the spatial position and arrival time of particles. Some background noise is caused by excitation of the atoms in the detector that resulted from sources other than the particles of interest. Other background noise is caused by secondary effects from the detected particles that result in unusable data. For example, Compton scattering can result in photons being scattered and detected in a plurality of pixels. In general, noise events can be reduced by eliminating events with energies below a predetermined threshold.

To measure the energy of individual particles, the detector must be read before multiple events are accumulated for any pixel. This is necessary because the data stored in a pixel represents the energy collected by the corresponding pixel detector, and the image processing system generally cannot determine the number of particles generating energy in a given pixel before the data is read out. Hence, in prior art systems, to obtain data on the energy of individual particles, no more than one particle can pass through the pixel detector between read-outs. This constraint requires that the pixel detectors be read out at a high frequency. In prior art systems, this is accomplished by periodically reading out the entire array at a high frequency. If the number of pixels in the image is large, the readout time can be excessive. The readout time determines the maximum flux of particles for which the detector can be used. It is advantageous to use high fluxes to reduce the exposure time, hence, long readout times are to be avoided.

In many applications, recording the time of arrival of the particles at the detector also allows for improved image quality. For example, when generating an image of a medical patient, the natural movements of the body associated with breathing can cause blurring of the image when the time needed to accumulate data for the image takes longer than a small fraction of the breathing cycle. One method for reducing blurring is to correlate the arrival time of particles with specific points in the relevant bodily cycle. For example, by limiting the image to gamma-rays that are detected when the patient has completed inhaling, motion artifacts can be reduced.

In prior art systems, this is accomplished by activating the detector only during the "allowed" time periods. Hence, most of the data available to the detector is not recorded. This leads to inefficient use of the detector and increased image acquisition times. Alternatively, the detector could be read out at a number of different times in each breathing cycle and separately accumulated to provide a number of images that represent the patient at each of a number of points in the breathing cycle. However, this latter strategy imposes a significant computational load on the read-out system, because of the high data rates inherent in reading out the entire array a number of times during each breathing cycle.

As noted above, each pixel detector consists of a region in which the energy is deposited by a particle (i.e., a particle detection region) and a read-out circuit (i.e., a data acquisition region) that is used to generate an electrical signal indicative of the energy deposited by particles since the last read-out. Detectors for different energies and types of particles differ from one another primarily in the particle detection region. Prior art systems, however, are constructed with an single type of particle detection region packaged permanently with an electronic data acquisition system. This increases the cost of systems by reducing the economies of scale that would be available if a single electronic system could be used for a wide variety of detectors.

Accordingly, there is a need for improved electronic data acquisition circuitry for use in a particle detection system that eliminates disadvantages of prior art systems.

SUMMARY OF THE INVENTION

Broadly, it is the object of the present invention to provide an improved data acquisition system for obtaining information on particles detected by a particle detection system.

Another object of the present invention is to provide a particle detection system having high spatial resolution.

Yet another object of the present invention is to provide a particle detection system that can discriminate between events based on the energy deposited in the particle detectors.

A further object of the present invention is to provide a particle detection system having high time resolution capabilities.

A still further object of the present invention is to provide an electronic system that can be used in a variety of particle detection systems.

Yet a further object of the present invention is to provide an electronic data acquisition system having a reduced readout time.

These and other objects of the present invention will become apparent to those skilled in the art from the following detailed description of the invention and preferred embodiments, the accompanying drawings and the appended claims.

Broadly stated, the present invention encompasses a data acquisition system for obtaining data from particle detection regions of a particle detection system. The data acquisition system is constructed from an array of data acquisition circuits. Each circuit is adapted for processing the signal generated by one pixel detector. The data acquisition circuit includes an input port for receiving an input current generated by the detection of a particle. The data acquisition circuit has an amplifier for generating an amplified voltage that is related to the integral of the input current. The data acquisition circuit also contains a charge storage device for storing an amount of charge that is related to the amplified voltage, and a charge readout circuit for measuring the amount of stored charge. The data acquisition circuit also includes a reset means for discharging the stored charge after the charge has been measured.

In the preferred embodiment, the data acquisition circuit has a discriminator for generating a read signal if the amplified voltage exceeds a predetermined value. The readout signal is used to trigger the reading of a limited number of pixels. In the preferred embodiment, a set of data acquisition circuits are arranged in rows and columns, forming an array of data acquisition pixels. In response to a particle hit, each pixel in the column where the hit occurred is read out and then reset.

DETAILED DESCRIPTION OF THE INVENTION AND PREFERRED EMBODIMENTS

The present invention encompasses an event driven particle detection system. The detection system can detect the position, arrival time, and energy deposited by individual particles. The detection system can be adapted to detect a wide variety of particle types.

The particle detection system utilizes a particle detection pixel array and a data acquisition pixel array. Each pixel cell, or pixel, within the particle detection pixel array is preferably a particle detector that generates an electrical current when a particle interacts with the material of the detection pixel. Each pixel in the particle detection pixel array is in electrical contact with a pixel in the data acquisition pixel array. Electrical current generated in the particle detection pixels upon the arrival of particles is integrated to produce a voltage in the corresponding data acquisition pixels. This voltage is detected by a trigger circuit, which initiates readout of limited portions of the array to obtain data relating to the detected particle. The data obtained is time tagged to indicate the arrival time of the particle. After a pixel is read, the relevant hardware is reset to allow for detection of future particles.

The trigger circuit assures that particles generating less than a threshold amount of energy do not trigger a readout. This reduces the signal processing load by assuring that background noise or scattered particles do not trigger readout. In addition, this trigger circuit allows the readout electronics to identify a specific region of the array in which a particle was detected so that only that region needs to be readout. The threshold is selected so that ordinary background noise or particles scattered at large angles will not generate sufficient energy to trigger a readout.

In the preferred embodiment, the pixel detectors are arranged in an array having one or more rows and columns. A particle hit triggers a readout of pixels in the column where the hit occurred. This reduces the readout time in comparison to readout of the entire array. In addition, the remaining columns of pixels may still collect data during the period that the previously hit column is being read out and reset, eliminating dead time and allowing for high time resolution of multiple particles arriving at the detector.

In the preferred embodiment, the data acquisition array and the detection array are constructed separately and then bonded. The data acquisition array may be used with any detection array having the same pixel spacing. Thus, the same data acquisition array and data processing hardware can be used with various types of detection arrays that are suitable for detecting different types of particles and/or particles within different energy ranges.

Figure 1:
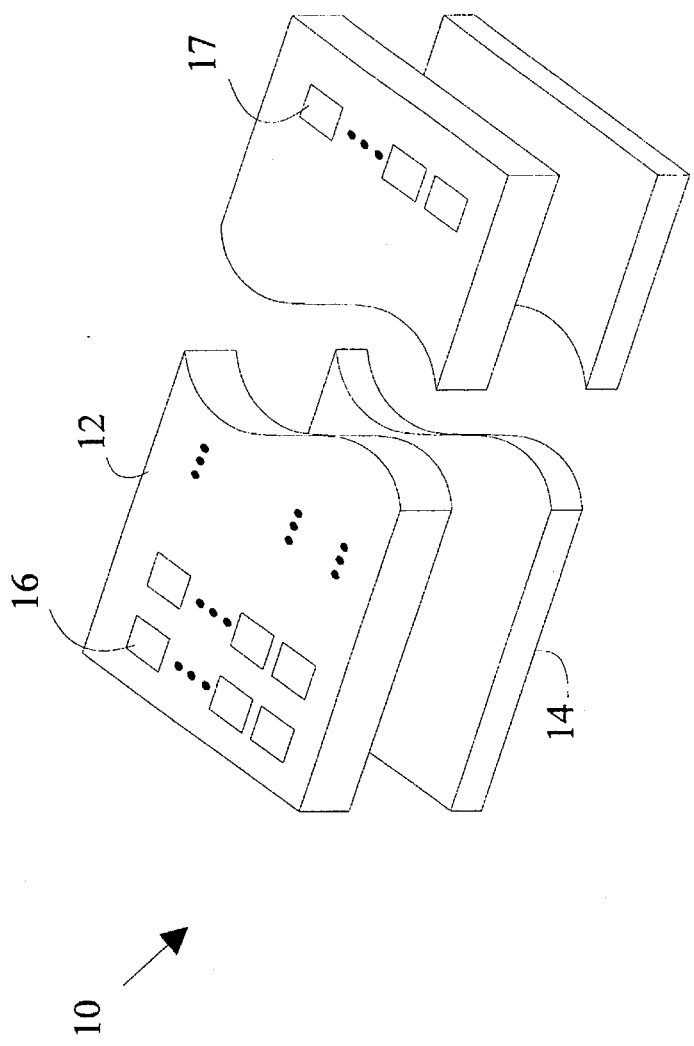
FIG. 1 shows a perspective view of a particle detection system according to the present invention.

A perspective view of a multiple-pixel particle detection system 10 according to the present invention is shown in FIG. 1. Particle detection system 10 has a particle detection pixel array 12 and a data acquisition pixel array 14.

Particle detection pixel array 12 preferably is a 64×256 array of particle detection pixels 16, each pixel consisting of a PIN diode for generating a pulse of electrical current when charged or non-charged particles traverse the pixel. The amount of charge generated in a pixel is related to the energy and charge of the detected particle, and the characteristics of the detector medium.

In the preferred embodiment of the present invention, each pixel preferably has a surface area that is approximately 30 μm×135 μm. Each particle detection pixel and data acquisition pixel can be uniquely identified by its row and column. For example, the pixel shown at 17 may be identified as row 256, column 1 in a 64×256 pixel array.

Data acquisition pixel array 14 is a 64×256 array of data acquisition pixels 18 (not shown in FIG. 1). Each pixel consists of a microcircuit, described in more detail below, for collecting and processing the current generated in a pixel of particle detection pixel array 12 upon the arrival of particles. As noted above, the amount of charge generated in the particle detection pixels is related to the energy and charge of the detected particles, and the characteristics of the detector medium. Thus, the data acquisition pixels obtain a measure of the particle energy deposited, which can be correlated with the address of the pixel and the arrival time of the particle.

Each data acquisition pixel is also approximately 30 μm×135 μm. Pixels 16 are each electrically coupled to one of pixels 18, preferably by a bond such as Indium or solder bump-bonding.

Data acquisition pixel array 14 may be coupled to any of a variety of similarly-sized particle detection pixel arrays appropriate for generating an electrical signal upon the arrival of specific types of particles. Data processing hardware generally interfaces with the data acquisition array. Thus, an identical data acquisition array and the same data processing hardware may be used to obtain data on a wide variety of particles. This is accomplished by simply changing the type of particle detection pixel array, and bonding it to a new, identical data acquisition array.

As explained further below, the readout of data from the data acquisition pixel array is event driven; that is, a readout is initiated by the current pulse delivered to the data acquisition pixel array in response to the interaction of a particle in the particle detection pixel array (i.e., upon the occurrence of a "hit"). Particle detection system 10 correlates the time-of-arrival of a particle at detection system 10 with the address of the hit, in terms of the row and column in which the hit occurred, and the amount of energy generated by the hit in the relevant particle detection pixel.

Figure 2:
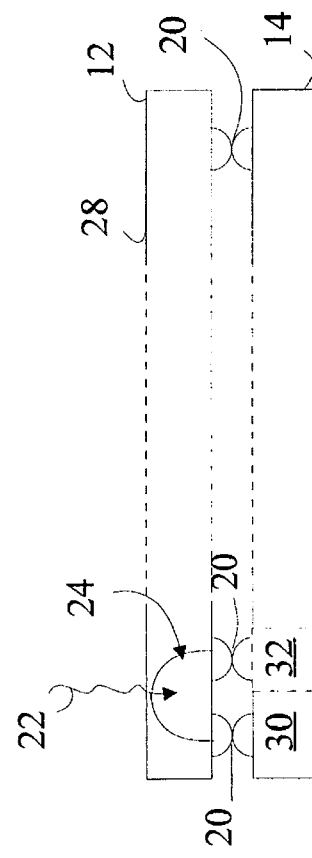
FIG. 2 shows a cross-sectional view of a particle detection system according to the present invention.

Referring now to FIG. 2, a cross-sectional view of particle detection system 10 is shown. Particle detection pixel array 12 is shown coupled to data acquisition pixel array 14 by means of indium or solder bump bonding 20. A separate electrical bond connects each pixel in array 12 with a pixel in array 14.

As an example, a photon 22 is shown hitting particle detection pixel array 12. The interaction of photon 22 with the material in pixel array 12 generates a distribution of electron-hole pairs 24. Surfaces 26 and 28 of array 12 are maintained at different voltages such that a current pulse flows from surface 28 to surface 26 when the electron-hole pairs are generated, producing pulses of current in data acquisition pixels 30 and 32. As explained further in connection with FIG. 3, the currents produced in pixels 30 and 32 are integrated and voltages proportional to the integrated currents are generated in pixels 30 and 32. The respective amounts of voltage generated in pixels 30 and 32 can be used to determine the approximate spatial position of photon 22 as it traverses the particle detection pixel array.

Figure 3:
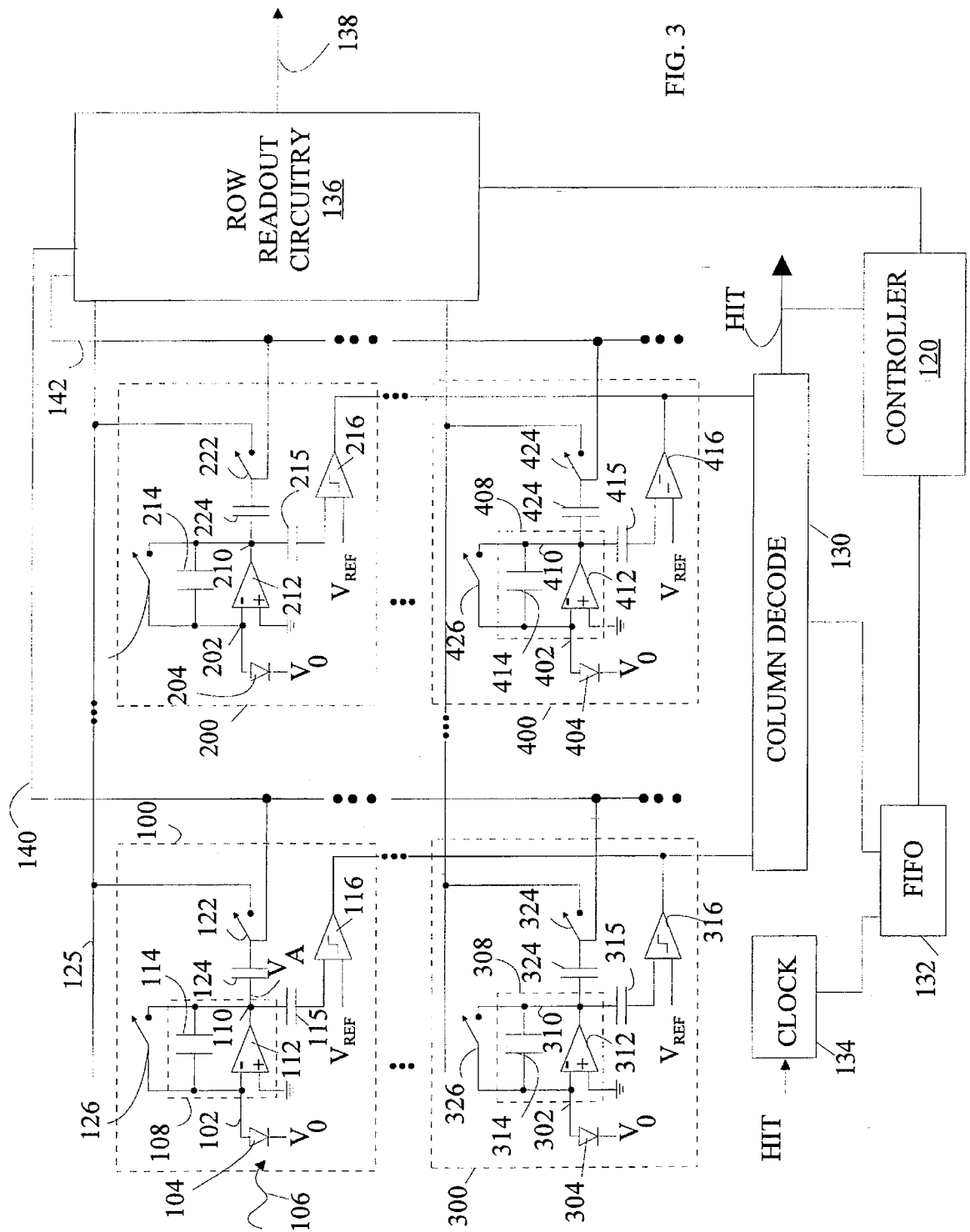
FIG. 3 is a block diagram showing a particle detection system according to the present invention.

FIG. 3 is a block diagram showing four pixels within a data acquisition pixel array according to the present invention, along with interconnections among the pixels and control circuitry for reading data from the array. It will be recognized that due to the relatively small number of elements in the data acquisition circuitry of each pixel, the pixels may be fabricated in a small, dense package using conventional VLSI fabrication techniques. This allows for high spatial resolution due to small pixel size.

The four pixels shown in FIG. 3 are representative of four pixels in a large pixel array. The pixels are arranged in columns, pixels 100 and 300 being in one column and pixels 200 and 400 being in another column. The pixels are also arranged in rows, pixels 100 and 200 being in one row and pixels 300 and 400 being in another row. For the sake of clarity, the remaining pixels of the array are not shown in FIG. 3, their existence being indicated by the dotted lines in the columns and rows shown in FIG. 3.

The internal circuitry and operation of data acquisition pixel 100 are specifically described below in detail. Data acquisition pixels 200, 300, and 400 (and all other pixels in the array) contain circuitry identical to the circuitry of data acquisition pixel 100 and operate identically to pixel 100. Thus, the internal circuitry and operation of these pixels will not be further described. The elements of data acquisition pixels 200, 300, and 400 are numbered such that the first digit is the same as the first digit of their respective pixels, and the second two digits are the same as the second two digits of the corresponding elements of pixel 100.

Data acquisition pixel 100 has an input port 102 coupled to a back-biased PIN diode 104 by bump bonding (not shown), the other end of the diode being coupled to a voltage $V_o$. PIN diode 104 is in the particle detection pixel, located in a particle detection pixel array, that is coupled to data acquisition pixel 100.

Particles 106 are directed toward PIN diode 104. When particles 106 traverse PIN diode 104, a current pulse is generated in PIN diode 104. The total current through PIN diode 104 is a function of the number of electron-hole pairs generated in PIN diode 104, which is in turn a function of the deposited energy of the particle. The current generated in a particular PIN diode, such as PIN diode 104, is also a function of the position of particles 106 traversing the PIN diode array, because the electron-hole pairs generated by a given particle may be dispersed among two or more pixels, as shown in FIG. 2.

An integrating amplifier 108 converts the current at input port 102 to an amplified voltage $V_A$ at a node 110 that is proportional to the current at input port 102. Amplifier 108 preferably is an operational amplifier 112 having its noninverting input coupled to ground, its inverting input coupled to input port 102, its output coupled to node 110, and a feedback capacitor 114 coupled between its input and its output. Operational amplifier 112 and feedback capacitor 114 are configured as a conventional integrator having an output voltage substantially proportional to the integral of its input current.

As noted, one end of a capacitor 114 is coupled to the output of amplifier 108 at node 110. The amplified voltage $V_A$ generated by amplifier 108 is a result of charge being stored on capacitor 114. The amount of stored charge is proportional to $V_A$ and is therefore a function of the integral of the current generated in the particle detection pixel array by particles 106. Since the total current is a function of the deposited energy, the stored charge provides a measure of the energy deposited by particles 106.

The amount of stored charge may be read by a readout circuit including a correlated double sampling capacitor 124 and a readout switch 122 that are coupled in series between node 110 and a row conductor bus 125. Row conductor buses such as row conductor bus 125 are coupled to the readout switch of each pixel in a given row. For example, row conductor bus 127 is coupled to the readout switch of pixels 300 and 400, and to all other pixels in the same row. The operation of conductor 125 is described in detail herein. The remaining row conductor buses operate in a similar manner.

The amount of charge stored on capacitor 114 is measured by closing switch 122, thereby generating a current pulse through double sampling capacitor 124 to row conductor bus 125 that is a function of the stored charge. It will be recognized by those skilled in the art that correlated double sampling capacitor 124 reduces noise associated with resetting of the pixel and corrects for variations in the electrical background produced by amplifier 108.

In the preferred embodiment, readout is initiated only if the charge stored on capacitor 114 is sufficiently large, indicating a meaningful hit by a sufficiently energetic particle. This is accomplished by a discriminator circuit coupled to capacitor 115. One end of capacitor 115 is coupled to node 110. The other end of capacitor 115 is coupled to a first input of a comparator (or discriminator) 116, a second input of which is coupled to a reference voltage $V_{REF}$. The amplified voltage $V_A$ generates a voltage pulse at the first input of discriminator 116. If the voltage at the first input of discriminator 116 reaches a value greater than reference voltage $V_{REF}$, a read control signal (shown as $I_{READ}$) is generated at the output of discriminator 116. The read control signal is used to notify the controller 120 that a sufficiently energetic particle has hit a pixel in the particle detection pixel array and that a readout should be initiated.

In the preferred embodiment of the present invention, the outputs of the discriminators from each pixel in a given column are ORed together in column decoder 130. The resulting signal, representing that at least one pixel in a given column has been hit, is sent to controller 120 to indicate that a hit has occurred. Column decoder 130 determines the column address of the hit and places the address in a FIFO buffer 132. For each hit, in FIFO order, controller 120 generates a column read signal indicating that each pixel in the relevant column is to be read.

When a hit occurs, the time indicated on a clock 134 is also recorded and stored in FIFO buffer 132. In this manner, each particle impact is time tagged; that is, the arrival time of the particle at the particle detection pixel array is recorded.

The column read signal generated by controller 120 is sent to the row readout circuitry 136. Row readout circuitry 136 initiates a parallel readout of each data acquisition pixel in the hit column by closing the readout switch for each pixel in that column. This is accomplished by sending a pixel read signal to each pixel in the column on pixel readout control lines that control all readout switches in that column. Pixel readout control lines 140 and 142 are shown coupled to all readout switches in the columns containing, respectively, pixel 100 and pixel 200.

The stored charge in each pixel is then measured by measuring the current pulse generated through the correlated double sampling capacitors to each row conductor. As noted above, the stored charge is a measure of the energy deposited by particles 106. The row position of the pixel that was hit and this measure of the particle energy are then correlated with the column address and time of the hit. This information is provided for processing at output port 138.

After readout of the pixels, controller 120 closes reset switch 126 (and all other reset switches in the same column), allowing capacitors 114, 115 and 124 (and corresponding elements in the same column) to discharge. Switches 122 and 126 are then opened. Pixel 100 and other pixels in the same column are therefore reset to await the next particle arrival.

As noted above, it is possible for a hit to generate energy in more than one pixel. The distribution of energy among these multiple pixels may be statistically analyzed, in a conventional manner, to improve the spatial resolution of the particle detection system. For example, given a pixel dimension of 30 µm, the spatial resolution of the system may be improved to about 2 µm in that coordinate using conventional statistical analysis, if charge is deposited across that pixel coordinate boundary.

Due to the event driven nature of the particle detection system, resets occur only after a readout in response to a hit. Furthermore, only one column must be reset after each hit. Thus, chip dead time is lower than that in prior art systems involving reset of the entire pixel array either periodically or after each hit. If desired, however, the entire array may be readout and/or reset after each hit.

In the preferred embodiment, the row conductor buses transmit electrical charge signals from the data acquisition pixels, and read control signals $I_{READ}$ preferably are electrical current signals. It will be recognized that by using charge and current signals, rather than voltage signals, crosstalk among pixels is reduced. When charge and/or current signals are used in this manner, the signals are converted to voltages in the row readout circuitry and/or column decoder for further processing.

In many embodiments, the row readout circuitry includes a discriminator coupled to each row conductor bus through a charge-to-voltage converter, passing through only signals greater than a predetermined value, so that only meaningful data is further processed.

It will be recognized by those skilled in the art that a 64×256 array of 30 μm×135 μm pixels has been used for exemplary purposes only, and that pixel arrays and cells of any shapes or sizes may be used in accordance with the present invention.

The present invention has been described using a detection array of back-biased PIN diodes. It will be recognized that the present invention may be used with any means of generating electrical current, electron-hole pairs or electron-ion pairs upon detection of particles, and the use of voltages to collect the generated charge for processing by the data acquisition pixels.

It will be recognized that a data acquisition pixel array according to the present invention may be fabricated using any conventional method, including any conventional VLSI fabrication technique using any conventional material, such as silicon or gallium arsenide.

The terms photons, x-rays and gamma rays have been used herein for exemplary purposes only. It will be appreciated that the present invention is useful for detecting electromagnetic radiation generally.

Various modifications to the present invention will become apparent to those skilled in the art from the foregoing description and the accompanying drawings. Accordingly, the present invention is to be limited solely by the scope of the following claims.

What is claimed is:

1. A data acquisition system, comprising:

a plurality of data acquisition pixels, said data acquisition pixels being arranged in a plurality of rows and columns, each said data acquisition pixel having an input port for receiving an input current, an amplifier means for generating an amplified signal that is related to the integral of said input current, a charge storage means for storing an amount of charge that is related to said generated amplified signal, a charge readout means for generating a signal indicative of the amount of stored charge, a reset means for discharging said stored charge on said charge storage means of each said data acquisition pixel in response to a reset signal, and a discriminator means for generating a hit signal if said voltage generated by said amplifier means exceeds a predetermined voltage; and a control means having a plurality of column detection means for generating a column readout signal if any of said discriminator means in a column has generated a hit signal. the generation of said column readout signal causing all data acquisition pixels in said column to be readout.

2. The data acquisition system of claim 1, wherein said control means further comprises:

a clock means for generating a time value indicative of the time at which said column detection means generates said column signals.

3. The data acquisition system of claim 1, wherein said control means further comprises:

buffer means for storing a signal specifying which column generated one of said column readout signals;

column readout means for controlling said charge readout means in each of said data acquisition pixels in a column in response to said column readout signals related to said column.

4. The data acquisition system of claim 1 wherein each said input port comprises means for electrically connecting said input port to a corresponding diode in an array of diodes, each said diode providing a means for detecting a charged particle passing therethrough, said array of diodes being constructed on a substrate separate from that on which said data acquisition system is constructed.

\* \* \* \* \*

UNITED STATES PATENT AND TRADEMARK OFFICE
CERTIFICATE OF CORRECTION

PATENT NO : 5,619,040
DATED : 04/08/97
INVENTOR(S) : Shapiro, et al.

It is certified that error appears in the above-identified patent and that said Letters Patent is hereby corrected as shown below:

Column 1, line 2:

AS FIRST PARAGRAPH: add "This invention was made with Government support under contract DE-AC03-76SF00515 awarded by the U.S. Department of Energy. The Government has certain rights in this invention."

Signed and Sealed this

Twelfth Day of August, 1997

Attest:

BRUCE LEHMAN

Attesting Officer

Commissioner of Patents and Trademarks